United States Patent
Yoon

(10) Patent No.: US 7,446,731 B2
(45) Date of Patent: Nov. 4, 2008

(54) COMPUTER SYSTEM AND DISPLAY METHOD THEREOF

(75) Inventor: Hyung-Jin Yoon, Seongnam (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 724 days.

(21) Appl. No.: 10/793,843

(22) Filed: Mar. 8, 2004

(65) Prior Publication Data

US 2004/0227692 A1   Nov. 18, 2004

(30) Foreign Application Priority Data

May 14, 2003   (KR)   ...................... 10-2003-0030658

(51) Int. Cl.
*G09G 5/00* (2006.01)
(52) U.S. Cl. .......................... 345/2.2; 345/1.1; 345/3.1
(58) Field of Classification Search ........... 345/1.1–3.4, 345/204–215, 690–699
See application file for complete search history.

(56) References Cited

U.S. PATENT DOCUMENTS

| 6,759,996 | B1 * | 7/2004 | Someya et al. ............... 345/1.1 |
| 7,123,248 | B1 * | 10/2006 | Lafleur ......................... 345/204 |
| 7,136,042 | B2 * | 11/2006 | Magendanz et al. ......... 345/100 |
| 7,161,557 | B2 * | 1/2007 | Thornton ..................... 345/2.1 |
| 7,193,583 | B2 * | 3/2007 | Zerphy et al. ................. 345/1.3 |
| 2002/0067318 | A1 * | 6/2002 | Matsuzaki et al. ........... 345/1.1 |
| 2003/0098820 | A1 * | 5/2003 | Someya et al. ............... 345/1.3 |
| 2003/0179155 | A1 * | 9/2003 | Someya ........................ 345/1.1 |
| 2004/0085257 | A1 * | 5/2004 | Tani et al. .................... 345/1.1 |

FOREIGN PATENT DOCUMENTS

| JP | 6-339094 | 12/1994 |
| JP | 2000-177293 | 6/2000 |
| JP | 2001-67054 | 3/2001 |
| JP | 2001-195007 | 7/2001 |
| JP | 2001-306631 | 11/2001 |
| JP | 2002-215284 | 7/2002 |
| KR | 1998-67016 | 12/1998 |
| KR | 1999-63614 | 7/1999 |
| KR | 2001-19105 | 3/2001 |

* cited by examiner

*Primary Examiner*—Vijay Shankar
(74) *Attorney, Agent, or Firm*—Staas & Halsey LLP

(57) ABSTRACT

A computer system having a main body, a first display device connected to the main body to display a picture and at least one other display device in communication with the main body to display a picture. The computer system has a user selection part to input a selection of displaying an image displayed on the first display device on the at least one other display device until another input selection or release. A control part controls transmission of a video signal corresponding to the selected image to the at least one other display device based on the user selection part. Thus, same or different images can be displayed on a plurality of display devices according to a user selection.

22 Claims, 8 Drawing Sheets

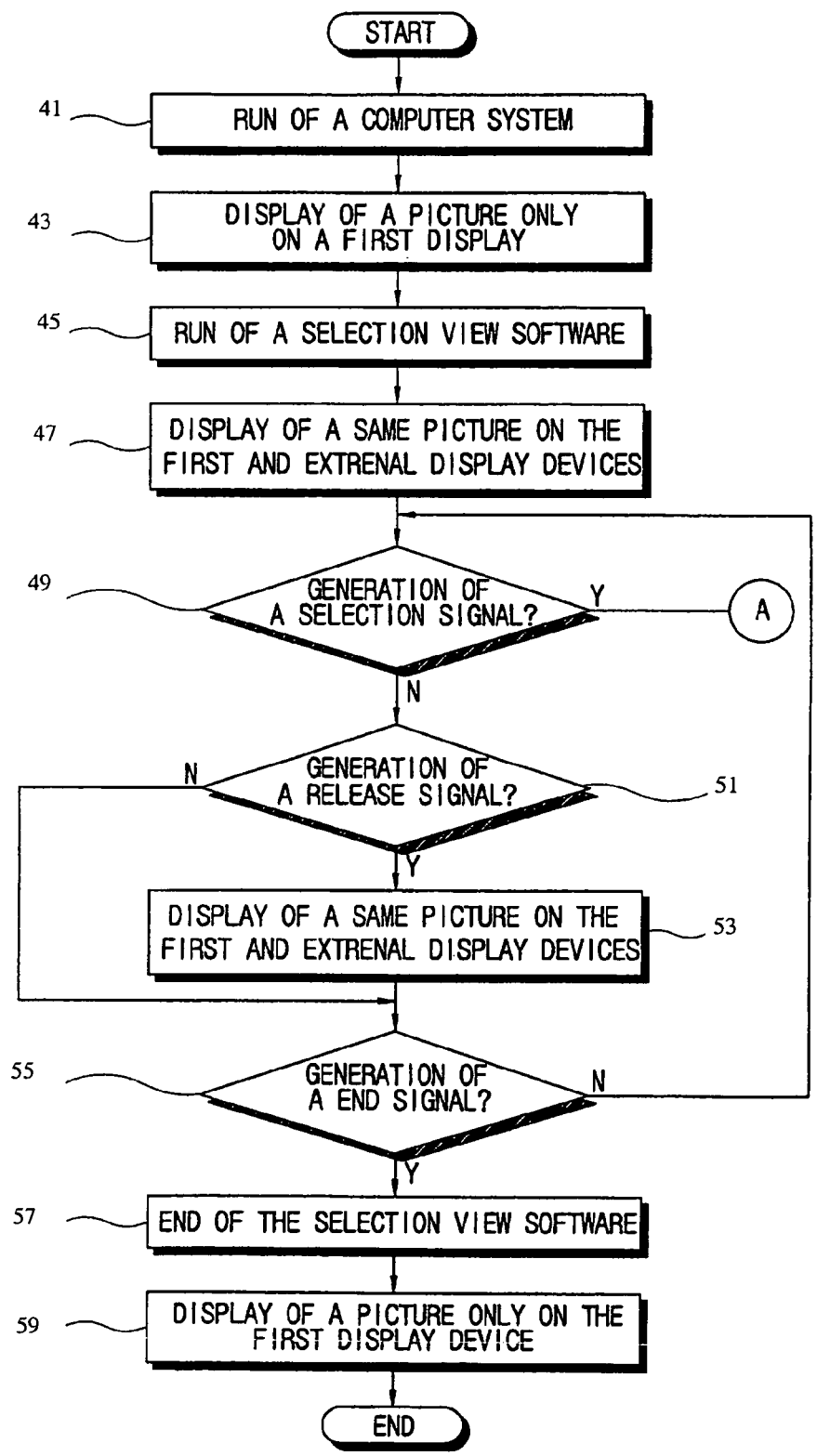

COMPUTER SYSTEM AND DISPLAY METHOD THEREOF

CROSS-REFERENCE TO RELATED APPLICATIONS

This application claims the benefit of Korean Patent Application No. 2003-30658, filed on May 14, 2003, in the Korean Intellectual Property Office, the disclosure of which is incorporated herein by reference.

BACKGROUND OF THE INVENTION

1. Field of the Invention

The present invention relates to a computer system and a display method thereof, and more particularly to a computer system provided with a plurality of display devices simultaneously displaying same or different pictures as needed, and a display method with such computer system.

2. Description of the Related Art

In conventional computer systems, including a portable computer and the like, an external display device can be connected with I/O ports provided in the computer main body, so that a display device can be provided in addition to the computer LCD monitor connected to the main body. In the computer system including the additional external display device, graphic cards connectable to a plurality of display devices are provided in the main body of the computer system, so that a same picture (image) is displayed on the plurality of display devices.

As disclosed in Korean patent first publication No. 2001-19105, if a Set-Top Box is installed, pictures displayed on a plurality of display devices may be different from one another. In a presentation and the like, it may be desirable that pictures displayed on the display device of the main body are the same as the pictures displayed on the external display device, but occasionally the pictures should be different. For example, during a presentation, a presenter may want to see a particular picture or a working process without opening the picture or the working process to the public (viewing audience). In particular, if the same picture is displayed on the display device of the main body and the external display device, the presentation may not be performed smoothly, thereby decreasing concentration of the viewers and the efficiency of the presentation.

Further, if a Set-Top Box or another device is used to output different images to be displayed on the display device of the main body and the external display device, it may increase the presentation system cost or make the presentation not smooth, because the display devices are not closely connected.

SUMMARY OF THE INVENTION

Accordingly, the present invention provides a computer system with a plurality of display devices simultaneously displaying the same or different pictures (images) as needed, and a method of displaying with such a computer system.

Additional aspects and/or advantages of the invention will be set forth in part in the description which follows and, in part, will be obvious from the description, or may be learned by practice of the invention.

The present invention may be achieved by a computer system having a main body; a first display device connected to the main body to display a picture; and at least one external display device connected with I/O ports provided in the main body to display a picture, the computer system comprising a user selection part selecting a picture displayed on the first display device; and a control part controlling transmission of a video signal, which corresponds to the picture selected based on a selection signal from the user selection part, to the at least one external display device through the I/O ports and controlling display of the selected picture on the at least one external display device.

According to an aspect of the invention, the computer system further comprises a memory part storing the video signal of the selected picture, wherein the control part controls displaying the video signal stored in the memory part on the external display device.

According to an aspect of the invention, the control part controls displaying the selected picture on the external display device before a next selection signal is transmitted from the user selection part.

According to an aspect of the invention, the control part determines whether the I/O ports of the main body are connected with the at least one external display device and controls displaying the selected picture on the external display device, if the I/O ports of the main body are connected with the at least one external display device.

According to an aspect of the invention, the control part controls displaying a warning message on the first display device, if the I/O ports of the main body are not connected to the at least one display device.

The present invention may also be achieved by a method of displaying on a computer system that comprises a main body; a first display device connected to the main body to display a picture; and at least one external display device connected with I/O ports provided in the main body to display a picture, the display method comprising selecting the picture displayed on the first display device by an operation of a user; and displaying the selected picture on the at least one external display device.

According to an aspect of the invention, the display method further comprises storing a video signal of the selected picture, wherein the displaying of the selected picture on the at least one external display device comprises displaying the stored video signal on the at least one external display device.

According to an aspect of the invention, the displaying of the selected picture on the at least one external display device comprises displaying the selected picture on the at least one external display device before a next selection signal is transmitted from the user selection part.

According to an aspect of the invention, the display method further comprises determining whether the I/O ports of the main body are connected with the at least one external display device; and displaying the selected picture on the at least one external display device, if determined that the I/O ports of the main body are connected with the at least one external display device.

According to an aspect of the invention, the display method displaying a warning message on the first display device, if the I/O ports are not connected to the at least one external display device.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIGS. 3A, 3B, and 3C are flow charts of displaying images on the computer system shown in FIG. 2, according to an embodiment of the present invention;

DETAILED DESCRIPTION OF THE PREFERRED EMBODIMENTS

Figure 1:
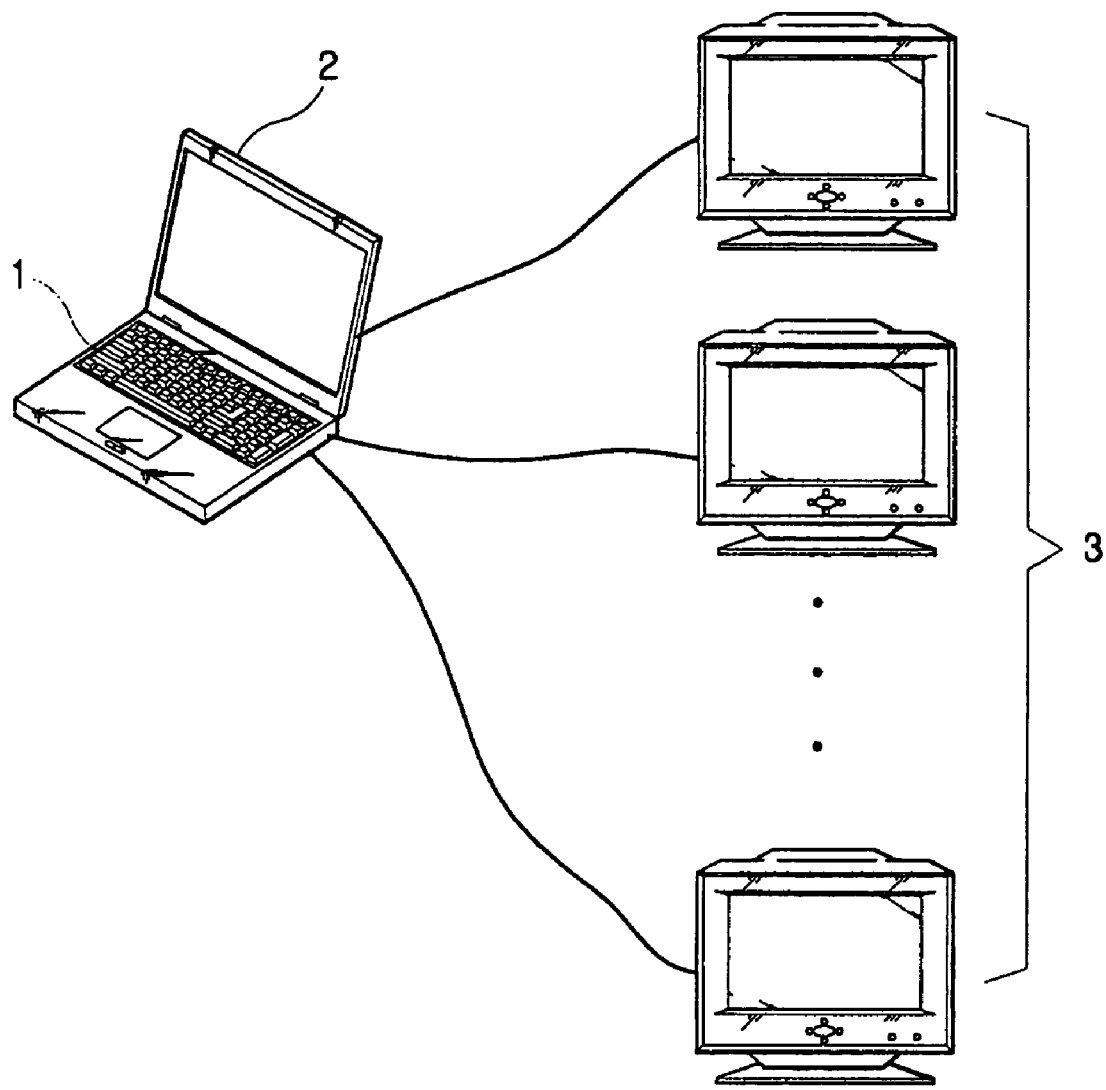
FIG. 1 schematically shows a computer system, according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 illustrates a computer system, according to an embodiment of the present invention. As shown in FIG. 1, a computer system 1 comprises a computer main body 1; and a first display device 2 hinge-connected to the main body 1 to display a picture (image). A plurality of external (second) display devices 3 can be connected with I/O ports (not shown) provided in the main body 1 to display pictures.

In the FIG. 1 described embodiment, the computer system 1 is, but not limited to, a portable computer. Concretely, the computer system 1 may be a desktop computer, a PDA (Personal Digital Assistants), or a mobile communications apparatus, such as a cellular phone, etc., which includes a main body containing a microprocessor controlling a general operation of the computer system and a first display device displaying a picture. An external or a second display device 3 may include another display device, such as a CRT (cathode-ray tube) or an LCD (liquid crystal display), a projector, a TV monitor and the like. According to an aspect of the invention, the number of second display devices 3 corresponds to the number of I/O ports of the main body 1.

In FIG. 1, the external display devices 3 are connected to graphic cards provided in the main body 1. The graphic cards are provided with a plurality of cables corresponding to a number of the external display devices 3 and an end of each cable is provided with a connector connectable to a connector of the external display device 3 to input and output a video signal. However, the present invention is not limited to such a configuration, and an interface unit may be employed to provide a plurality of I/O ports to transmit a video signal processed in the main body 1 of the computer system to a plurality of second display devices 3 regardless of whether the second display device 3 is an internal or an external unit.

Figure 2:
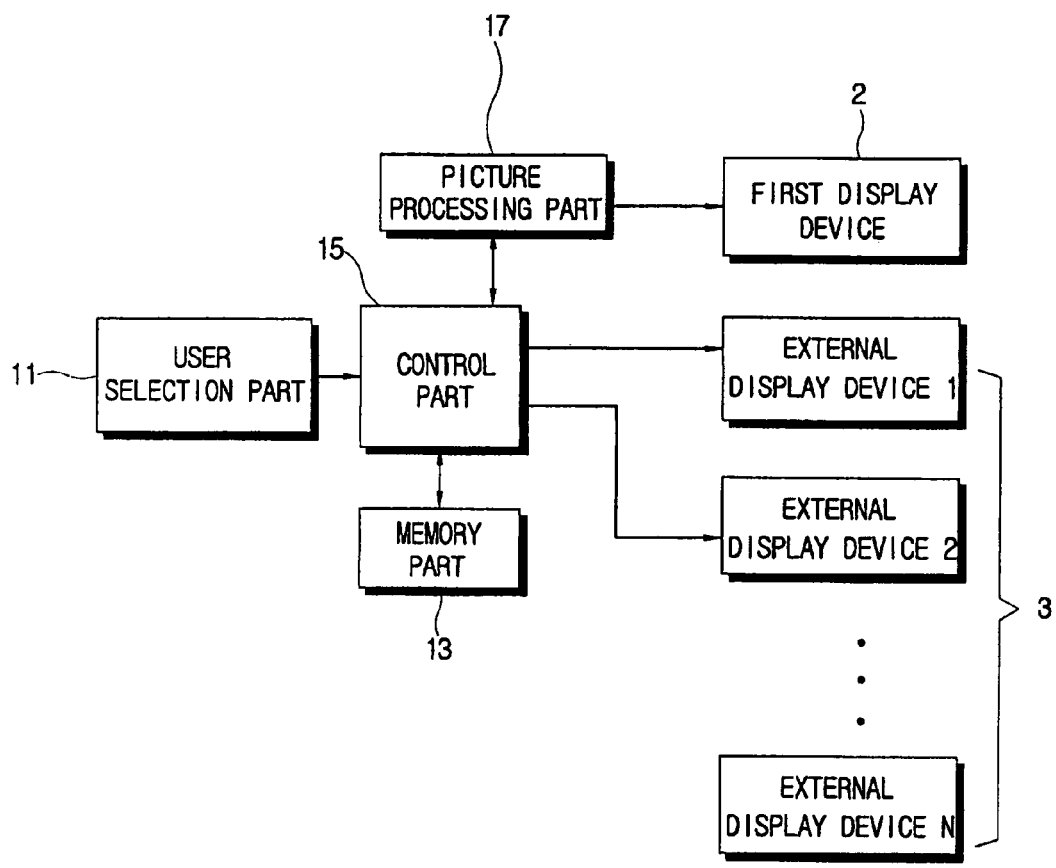
FIG. 2 is a functional control block diagram of the computer system shown in FIG. 1, according to an embodiment of the present invention.

FIG. 2 is a functional control block diagram of the computer system shown in FIG. 1, according to an embodiment of the present invention. As shown in FIG. 2, the computer system 1 of the present invention comprises a user selection part 11 to select a picture (output image) displayed on the first display device 2, i.e., a monitor of the computer main body 1; a memory part 13 to store temporarily the selected picture; and a control part 15 controlling display of the selected picture on the external display devices 3.

The user selection part 11 allows a user to input a selection of displaying the picture being displayed on the first display device 2 on the external display devices 3. In particular, the user selection part 11 transmits the input selection to the control part 15 to control the displaying among two or more display devices in communication with the computer system 1.

Typically, the user selection part 11 is implemented as a selection view software supplied to a user for displayed image selection convenience. The selection view software comprises a selection module loadable at any time before or during an image display operation to receive a user displayed image selection. Typically, the user displayed image selection is accomplished through a click of a button displayed on a displayed image, or according to an aspect of the present invention, through a push of a predetermined keyboard hot key. The user displayed image selection generates a displayed image selection signal, which is transmitted to the control part 15.

Typically, the selection view software embodying the user selection part 11, further comprises a running module to run the selection view software; a releasing module to release a displayed image selection, so that in the above-described FIG. 1 example embodiment a same picture is displayed on the first and external display devices 2 and 3; and an ending module to end the selection view software, thereby preventing a generation of the selection signal.

The memory part 13 stores the picture selected by a user through the user selection part 11. The selected picture is the picture being displayed on the first display apparatus 2 at a point of time when the selection signal is generated by the user via the user selection part 11. The selected picture is based on the video signal processed in the video signal processing part 17. Thus, the video signal corresponding to the picture being displayed on the first display device 2 when a user selects the picture is stored in the memory part 13.

The control part 15 controls displaying the selected picture on the external display device 3 when the selection signal is generated. More particularly, the video signal stored in the memory part 13 is read and transmitted by the control part 15. Then, the control part 15 controls transmitting the read video signal to the external display device 3 through the I/O ports and displaying the picture corresponding to the selected and stored video signal on the external display device 3.

According to an aspect of the present invention, the video signal is in a predetermined period, for example, in a refresh period of the external display device 3 when transmitted to the external display device 3. Thus, the picture displayed on the external display device 3 can be continually displayed until a next selection signal is received. According to another aspect of the invention, the control part may control storing the transmitted video signal in a memory part (not shown) of the external display device 3, and to display the stored video signal on the external display device 3 in a predetermined period until the next selection signal is received.

Further, the control part 15 determines whether the main body 1 is connected with the external display device 3. Typically, the determination of whether a connection with a second display device 3 is formed, is based upon a state of a pin of a connector provided in the main body 1. The control part 15 transmits a check signal to the pin and receives a returned check signal from the pin, thereby checking whether the second display device 3 connection is formed.

In the above-described FIG. 1 example embodiment, if the control part 15 determines that the main body 1 is not connected to any external display device 3, a warning message, such as "No connection with the external display device" is displayed on a display panel of the first display device 2, typically, in the form of a dialog box provided in a graphical user interface (GUI) window or in the form of an OSD (On Screen Display) message.

Figure 3B:
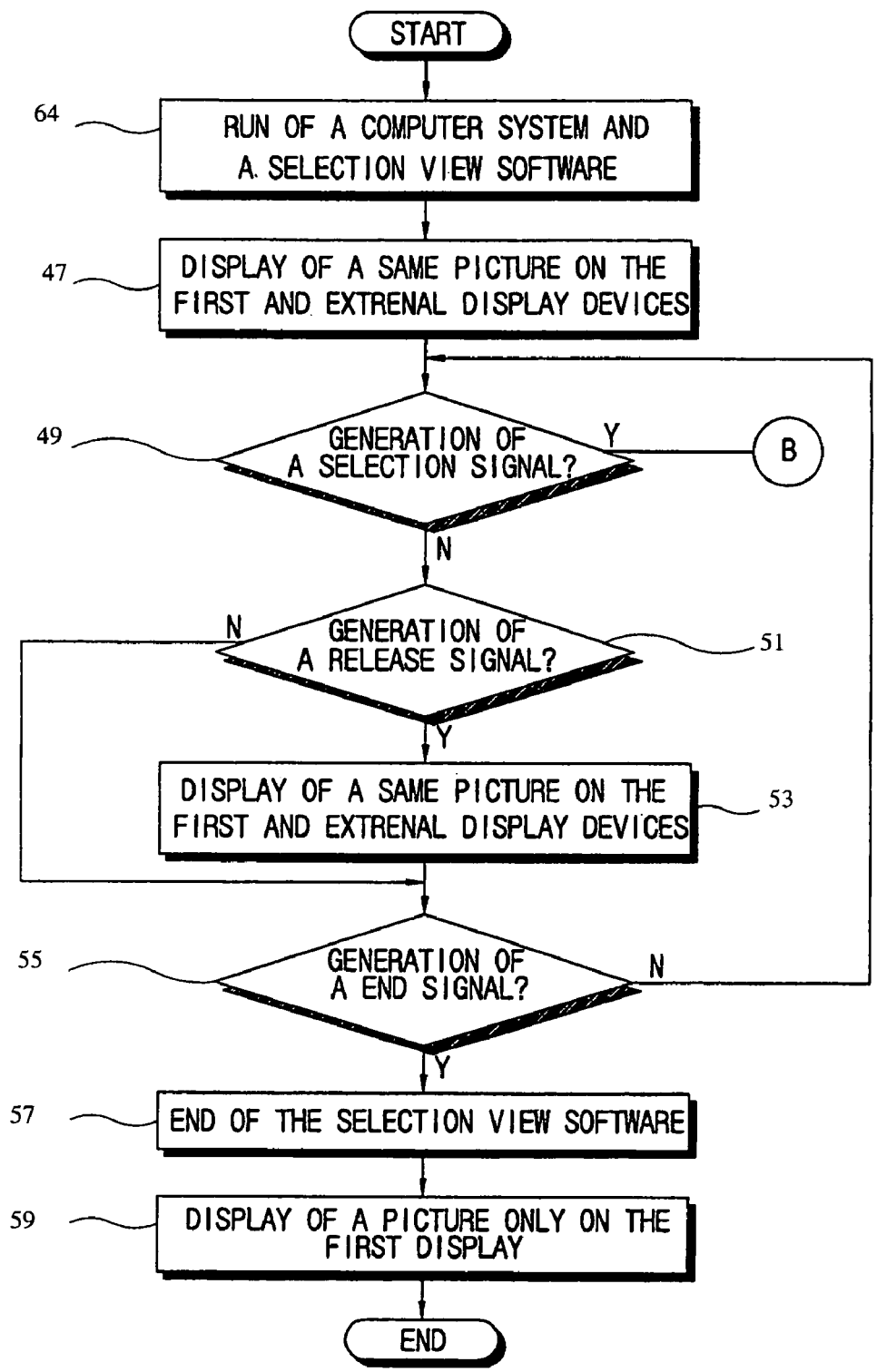
Figure 3C:
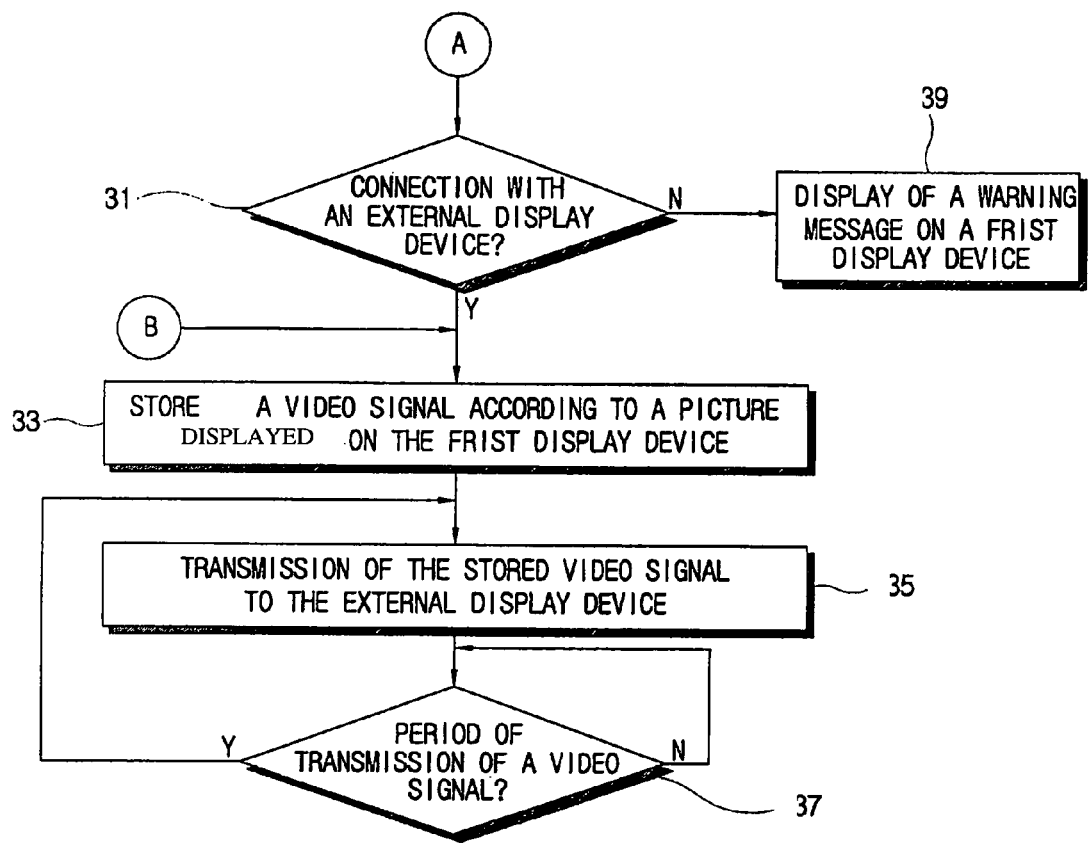

FIGS. 3A, 3B and 3C are flow charts of displaying images on the computer system shown in FIG. 2, according to an embodiment of the present invention. In FIG. 3A, if, at operation 41, a user runs the computer system 1 to work on the computer, at operation 43, a picture (image) is displayed only on the first display device 2 regardless of being connected to the external display device 3, i.e., the computer 1 operates according to a general computer system in which the picture is displayed on only one monitor connected to the computer main body 1. If, at operation 45, during a work (e.g., a presentation) with the executing computer system 1, a user runs the selection view software to display a same or a predetermined picture selected by the user on the first display device 2 and the external display device 3 as needed (e.g., activates the user selection part 11, for example, via a keyboard hot key or other input techniques), at operation 47, the same picture is displayed on the first display device 2 and the external display device 3 by running the selection view software S7.

According to an aspect of the invention, the selection view software 11 may run simultaneously with other applications, such as an image display application, running on the computer system 1. Like reference numerals in FIGS. 3A and 3B refer to like operations after execution of the image display selection view software 11. In this case, as shown in FIG. 3B, if, at operation 64, the computer system 1 and the selection view software 11 are executed simultaneously (e.g., the selection view software 11 is executed during startup of the computer system 1, or as previously started), at operation 47, a same picture is displayed on the first and external display devices 2 and 3. At operation 49, the control part 15 determines whether a selection signal is generated, wherein the selection signal makes the selected picture be displayed on the external display device 3, if a user selects a picture being displayed on the first display device 2 by using, for example, a selection button provided for displayed image selection by the selection view software 11.

In FIG. 3A, if determined, at operation 49, that the selection signal is generated, then, with reference to FIG. 3C, at operation 31, it is determined (i.e., the control part 15 determines) whether at least one external (second) display device 3 is connected with the I/O ports provided in the computer main body. If determined, at operation 31, that at least one external display device 3 is not connected with the connector(s) provided in the main body 1, typically, at operation 39, a warning message, such as "No connection with an external display device" is output on a display panel of the first display device 2. In FIG. 3B, however, when the selection view software 11 is run simultaneously with running of the computer system, operations 31 and 39 can be avoided after the operation 49 determination of whether a selection signal is generated. In other words, when at operation 49 it is determined that a displayed image selection signal is generated, at operation 33, the control part 15 receives the displayed image selection signal for processing.

More particularly, if determined, at operation 31, that at least one external display device 3 is connected with the connector(s) of the main body 1, at operation 33, a video signal corresponding to the picture being displayed on the first display device 2 is stored by the control part 15 in the memory part 13, when the selection signal is generated at operation 49. At operation 35, the video signal stored at operation 33, is transmitted to the external display device 3 through the I/O ports provided in the main body 1. Then, at operation 37, the external display device 3 displays the transmitted video signal until the next video signal is transmitted. In other words, the stored video signal in the memory part 13 is transmitted to the external display device 3 for a predetermined period of time before the next selection signal is generated, so that, at operation 37, the same picture is displayed on the external display devices 3 for a predetermined period.

Figure 4:
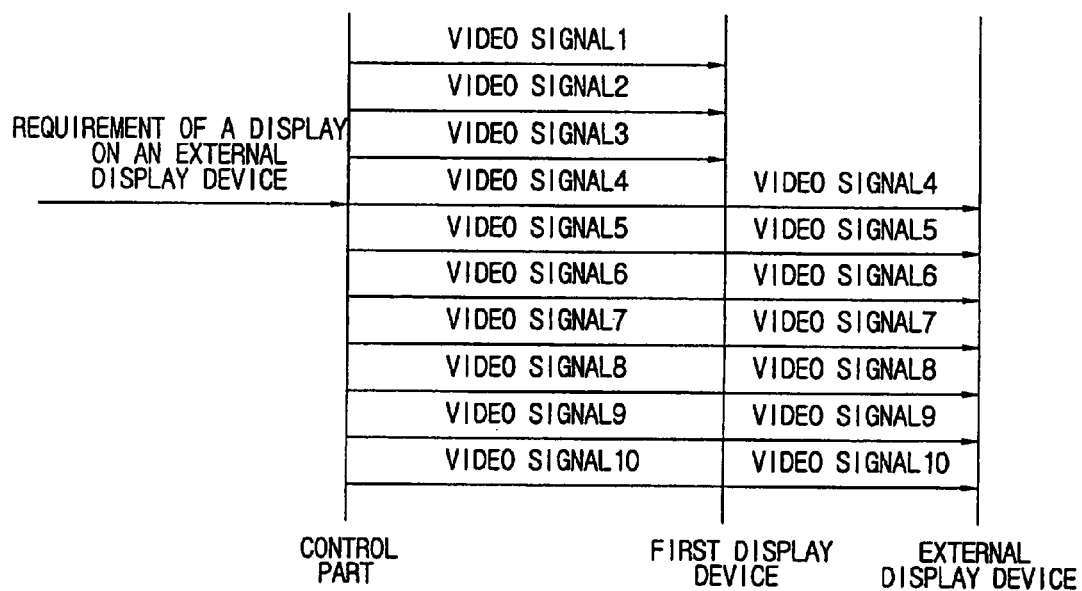
FIG. 4 is a sequence chart of conventional video signals.
Figure 5A:
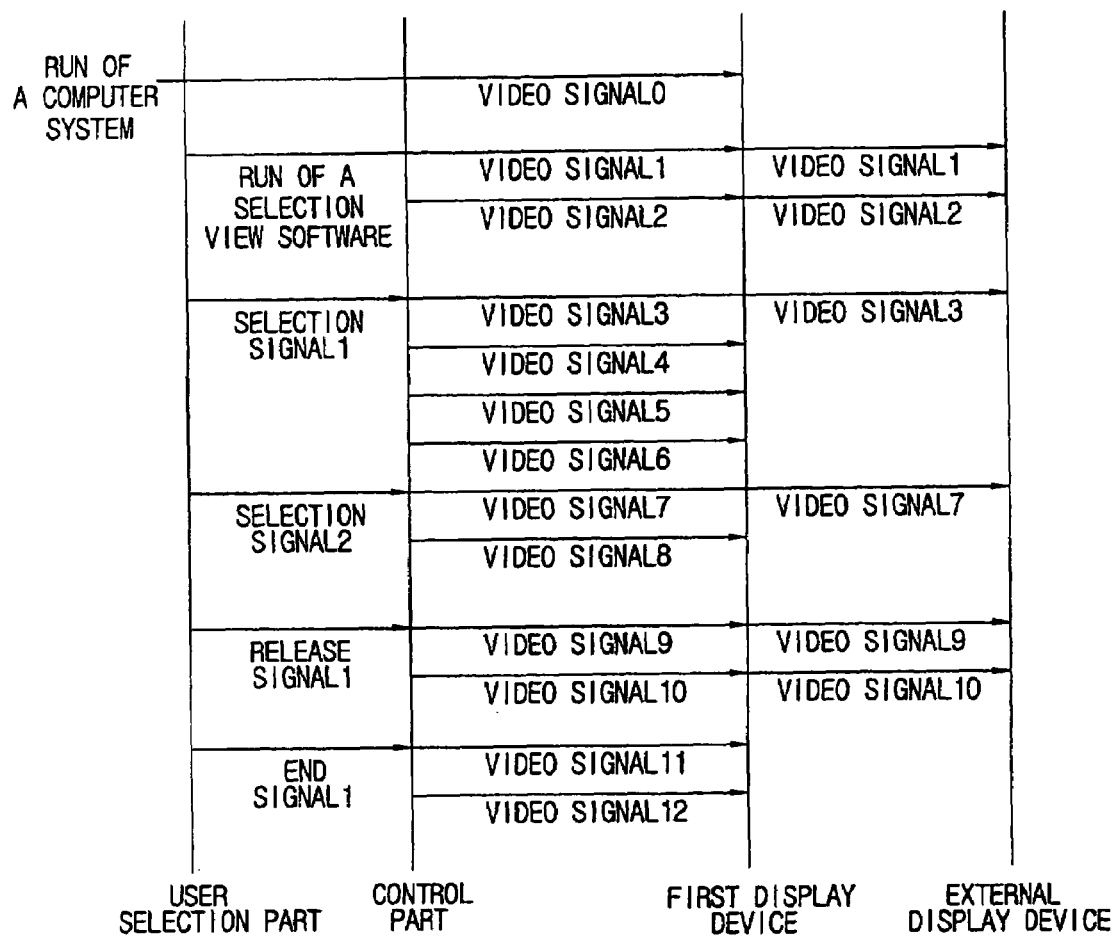
FIGS. 5A and 5B are sequence charts of video signals output to first and other computer display devices, according to an embodiment of the present invention.
Figure 5B:
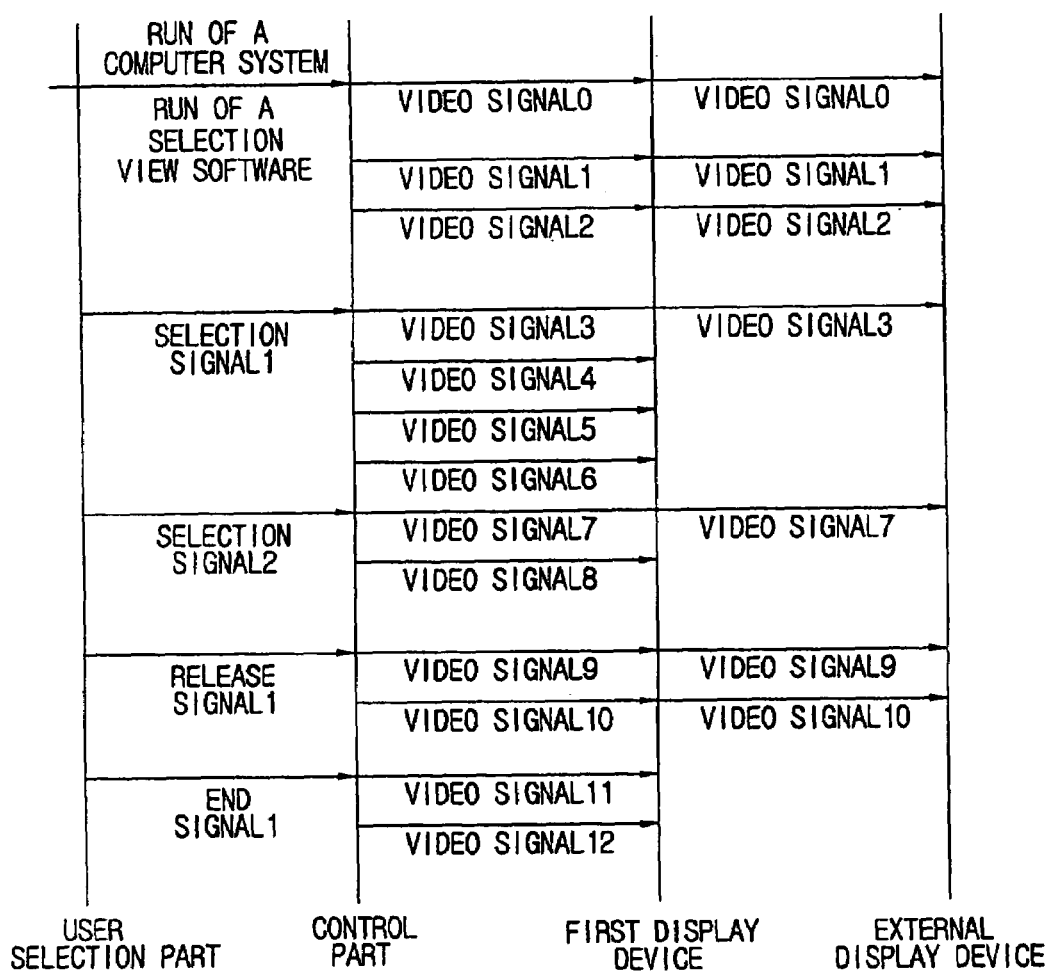

FIGS. 5A, and 5B show that pictures displayed on the first and external display devices 2 and 3 are the same or different according to the generation of the selection signal, according to an embodiment of the present invention. FIG. 4 is a sequence chart of conventional video signals. FIGS. 5A and 5B are sequence charts of video signals output to first and other computer 1 display devices 2 and 3, according to an embodiment of the present invention. In FIG. 4, according to the conventional video signal sequence, the same video pictures are displayed on the first and external display devices 2 and 3. In other words, if the external display device 3 is connected or run, so that it is required, as shown in FIG. 4, to display a picture on the external display device 3, the same video signal is transmitted to and displayed on the first and the external display devices 2 and 3.

FIGS. 5A and 5B show a video signal sequence according to the present invention. As compared with the conventional video signal sequence, if a user runs the computer system, the video signal (e.g., video signal 0) is displayed by the control part 15 only on the first display device 2, and not on the external display device 3. Thereafter, if the selection view software is run during a work with (i.e., during use on the computer system, the same effect as that generated when a user inputs a release signal (as will be described in more detail further below) through the user selection part 11 is generated. That is, the video signals (e.g., video signals 1, and then 2) corresponding to the picture being displayed on the first display device 2 is transmitted by the control part 15 to the external display device 3, so that the same picture is displayed on the first and external display devices 2 and 3. As shown in FIG. 5B, if the selection view software is executed simultaneously with the running of the computer system (for example, the selection view software is specified to a starting program in an operating system ), the same picture (e.g., video signals 0, 1, 2) is displayed by the control part 15 on the first and external display devices 2 and 3. Therefore, as shown in FIGS. 5A and 5B, in contrast to the conventional computer system, and according to an aspect of the present invention (but not limited to), a video signal is not automatically output to other connected display devices, unless the image display selection view software is executed (see operations 41-47 and 64 in FIGS. 3A and 3B).

In FIGS. 5A and 5B, if a displayed image selection of a user is input through the user selection part 11, a selection signal is generated (i.e., displayed image selection signals 1, 2). Whenever the selection signal (e.g., selection signal 1) is generated, the video signal (e.g., video signal 3) corresponding to the picture being displayed on the first display device 2 is also transmitted by the control part 15 to the external display device 3. Thus, if the selection signal 1 is generated, the same picture (e.g., video signal 3) as that being displayed on the first display apparatus 2, at the point of time when the selection signal is generated, is also identically displayed on the external display device 3.

More particularly, when a selection signal (referred to as selection signal-1 in FIG. 5A) is transmitted to the external display device 3, the picture based on the video signal corresponding to the selection signal (referred to as the video signal-3 in FIG. FIG. 5A) is continually displayed until a next generated selection signal (referred to as the selection signal-2 in FIG. 5A) is transmitted to the external display device 3. Therefore, in FIG. 5A, while pictures corresponding to the video signals-4 through -6 are displayed on the first display device 2, the video signal-3 corresponding to the selection signal-1 is continually displayed on the external display device 3, so that pictures displayed on the first and external display devices 2 and 3 are different from each other. After the next generated selection signal 2, another picture (e.g., video signal 7) as that being displayed on the first display apparatus 2, at the point of time when the second selection signal 2 is generated, is also identically displayed also on the external display device 3.

If pictures displayed on the first and external display devices 2 and 3 do not need to be different from each other, a user can generate a release signal by using a release button provided by the selection view software 11. More particularly, in FIGS. 3A and 3B, at operation 51, it is determined whether the release signal is generated, and if, at operation 51, generation of the release signal is determined, then, at operation 53, the function of the image display selection view software is released. In other words, at operation 53, an input release command releases the displayed image selection function. Thus, at operation 53, upon generation of the release signal 1, the pictures (e.g., video signals 9 and 10) displayed on the first and external display devices 2 and 3 are the same, because the video signal provided on the external display device 3 is the same as that provided on the first display device 2.

In FIGS. 3A and 3B, if it is no more required to provide the picture on the external display device 3, a user may generate an end signal by using an end button provided in the selection view software 11. More particularly, at operation 55, it is determined whether the end signal is generated, and if, at operation 55, generation of the end signal is determined, then, at operation 57, the image display selection view software terminates execution. Then, at operation 59, the transmitting of the video signal to the external display device 3 is ended, so that the picture (e.g., video signals 11 and 12) is, as shown in FIGS. 5A and 5B, displayed only on the first display device 2.

According to the present invention, the same or different pictures can be displayed on a plurality of display devices according to a user selection. Thus, a working space (displayed presentation images) required to be closed to the public (a viewing audience) can be closed, thereby increasing the concentration of the public and effectiveness of the work. The processes of the present invention as embodied, for example, in the user selection part 11, the control part 15, the memory part 13, and (as the case may be) in the picture processing part 17, are implemented in software and/or computing hardware. A computer system of the invention has a main body, a first display device connected to the main body to display a picture, and at least one other display device in communication with the main body to display a picture. The computer system has a user selection part to allow input of a selection of displaying an image displayed on the first display device on the at least one other display device until another input selection or release. A control part (as implemented in software and/or hardware) controls transmission of a video signal corresponding to the selected image to the at least one other display device based on the user selection part. Thus, same or different images can be displayed on a plurality of display devices according to a user displayed image selection.

Therefore, the present invention provides a computer system (i.e., any computing device, such as, without limitation, a desktop computer, a laptop/portable computer, a mobile phone/communication unit, a PDA, etc.) connectable with a first display device and at least one second display device, and comprising an image processor (e.g., image processing part 17) displaying an image on the first display device; and a programmed computer processor (i.e., the user selection part/ displayed image selection view software 11 and controller 15) allowing selection of the image processor image displayed on the first display device, and displaying the selected image on the at least one second display device while the image processor displays the image or a different image on the first display device. According to an aspect of invention, the programmed computer processor displays a selectable graphical display of an image selection button on the image processor image for selection thereof. According to another aspect of the invention, the programmed computer processor allows releasing the displaying of the selected image on the at least one second display device. Further, the present invention provides a machine readable storage storing at least one program controlling a computer with at least two or more display devices according to a process that comprises allowing selection of an image displayed on a first display device, and displaying the selected image on second display devices while the selected image or a different image is displayed on the first display device. Therefore, the present invention is directed to controlling storage (interception or retrieval) of video signals corresponding to an image currently displayed by an image processor on a display device, when a user selects the image, and outputting the stored video signals to other display devices independent of the displaying of the selected image or other images by the image processor on the first display device, and until a next image is selected or release of the displayed image selection function.

Further, the present invention provides, a method of simultaneously displaying same or different images on a plurality of display devices connected to a computer system, in response to a user input displayed image selection. According to an aspect of the invention the method further comprises displaying an image by an image processor on a first display device, displaying a selectable graphical display of a displayed image selection button on the image processor image on the first display device for selection thereof by the user (e.g., loading the displayed image selection view software 11), storing the image processor image on the first display device in a memory, in response to a selection of the image processor image as the user input displayed image selection via the image selection button, and displaying the stored image processor image on second display devices independent of the displaying of the displaying by the image processor on the first display device, until a next selection of a next image processor image or a release of the displaying the stored image processor image on the second display devices.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method, comprising: identically and simultaneously displaying a same or a different image on a plurality of display devices connected to a computer from a selected image selected from a plurality of separate images displayed on a first display device of the computer, in response to a user input displayed image selection, the method further comprising:
displaying an image by an image processor on a first display device;
displaying a selectable graphical display of an image selection button on the image processor image on the first display device for selection thereof by the user;
storing the image processor image on the first display device in a memory, in response to a selection of the image processor image as the user input displayed image selection via the image selection button; and displaying the stored image processor image on second display devices independent of the displaying of the displaying by the image processor on the first display device, until a next selection of a next image processor image or a release of the displaying the stored image processor image on the second display devices.

2. A computer system having a main body, a first display device connected to the main body to display a plurality of separate images, and at least one external display device connected with I/O ports provided in the main body to display the images, the computer system comprising:

a displayed image selector selecting one of the images displayed on the first display device, in response to a user input; and a controller controlling transmission of a video signal corresponding to the selected image, based on an image selection signal from the displayed image selector in response to the user input, to the at least one external display device through the I/O ports to identically display the selected image on the at least one external display device.

3. The computer system according to claim 2, further comprising a memory part storing the video signal of the selected image, wherein the controller controls displaying the video signal stored in the memory part on the at least one external display device.

4. The computer system according to claim 2, wherein the controller controls displaying the selected image on the at least one external display device until a next image selection signal is transmitted from the displayed image selector.

5. The computer system according to claim 3, wherein the controller controls displaying the selected image on the at least one external display device until a next image selection signal is transmitted from the displayed image selector.

6. The computer system according to claim 2, wherein the controller determines whether the I/O ports of the main body are connected with the at least one external display device, and controls displaying the selected image on the at least one external display device, if the I/O ports of the main body are connected with the at least one external display device.

7. The computer system according to claim 3, wherein the controller determines whether the I/O ports of the main body are connected with the at least one external display device, and controls displaying the selected image on the at least one external display device, if the I/O ports of the main body are connected with the at least one external display device.

8. The computer system according to claim 6, wherein the controller controls displaying a warning message on the first display device, if the I/O ports of the main body are not connected to the at least one external display device.

9. The computer system according to claim 7, wherein the controller controls displaying a warning message on the first display device, if the I/O ports of the main body are not connected to the at least one external display device.

10. The computer system of claim 2, wherein the entire selected image is displayed on the at least one external display device.

11. A method of displaying on a computer system having a main body, a first display device connected to the main body to display plurality of separate images, and at least one external display device connected with I/O ports provided in the main body to display an external display image, the display method comprising:

selecting the image displayed on the first display device according to a user input; and identically displaying the selected image on the at least one external display device, in response to the user input image selection, such that each external display image is a same or different image as displayed on the first display device in response to the user input.

12. The display method according to claim 11, further comprising:

providing a memory part storing a video signal of the selected image, wherein the displaying of the selected image on the at least one external display device comprises displaying the video signal stored in the memory part on the at least one external display device.

13. The display method according to claim 11, wherein the displaying of the selected image on the at least one external display device comprises displaying the selected image on the at least one external display device until a next user input image selection.

14. The display method according to claim 12, wherein the displaying of the selected image on the at least one external display device comprises displaying the selected image on the at least one external display device until a next user input image selection.

15. The display method according to claim 11, further comprising:

determining whether the I/O ports of the main body are connected with the at least one external display device; and displaying the selected image on the at least one external display device, if determined that the I/O ports of the main body are connected with the at least one external display device.

16. The display method according to claim 12, further comprising:

determining whether the I/O ports of the main body are connected with the at least one external display device; and displaying the selected image on the at least one external display device, if determined that the I/O ports of the main body are connected with the at least one external display device.

17. The display method according to claim 15, further comprising:

displaying a warning message on the first display device, if the I/O ports are not connected to the at least one external display device.

18. The display method according to claim 16, further comprising:

displaying a warning message on the first display device, if the I/O ports are not connected to the at least one external display device.

19. A computing device connectable with a first display device and at least one second display device, comprising:

an image processor displaying a plurality of separate images on the first display device; and a programmed computer processor allowing selection of the image processor image displayed on the first display device, and identically displaying the selected image on the at least one second display device while the image processor displays the image or a different image on the first display device.

20. The computing device of claim 19, wherein the programmed computer processor displays a selectable graphical display of an image selection button on the image processor image for selection thereof.

21. The computing device of claim 19, wherein the programmed computer processor allows releasing the displaying of the selected image on the at least one second display device.

22. A machine readable storage storing at least one program controlling a computer with at least two or more display devices according to a process comprising:

allowing selection of an image from a plurality of separate images displayed on a first display device; and identically displaying the selected image on second display devices while the selected image or a different image is displayed on the first display device.

* * * * *